Patented Nov. 27, 1923.

1,475,445

UNITED STATES PATENT OFFICE.

NEIL E. MORGAN, OF OGDENSBURG, NEW YORK.

INSECTICIDE.

No Drawing. Application filed September 28, 1921. Serial No. 503,779.

*To all whom it may concern:*

Be it known that I, NEIL E. MORGAN, a citizen of the United States, residing at Ogdensburg, in the county of St. Lawrence and State of New York, have invented certain new and useful Improvements in Insecticides, of which the following is a specification.

This invention relates to improvements in insecticides and consists of a foliage-adherent mixture in powdered form for dry application, whose essential ingredients are an agent destructive of insect life and a powder substantially insoluble in moisture and adherent to the foliage of the plant, this characteristic adherent quality enabling the mixture to effectively resist the tendency of rain and dew to wash the insecticide off the plant, and of the wind to blow it off, thereby retaining the compound on the plant as applied longer, even under adverse climatic conditions, and thus causing a greater mortality to the insects due to the prolonged presence on the foliage of the poisonous agent.

The invention further consists specifically in a mixture of the character referred to in which the agent destructive of insect life is calcium arsenate and the powder is a hydrous magnesium silicate compound in powdered form.

Calcium arsenate is well-known as an effective destroyer of insect life and in particular of the boll weevil but the great disadvantage or objection heretofore encountered in the use of this agent for dusting has been found to lie in the fact that it does not adhere well to the foliage but is readily washed off the plant by rain or dew or blown off by the wind, so that it tends to disappear rapidly from any parts of the plant to which it has been applied. This disadvantage, as stated above, is obviated by my invention.

My improved insecticide comprises a mixture of calcium arsenate and a hydrous magnesium silicate compound in the proportions of substantially eighty to twenty by weight. These ingredients are in powdered form and thoroughly mixed.

A hydrous magnesium silicate compound has the advantages heretofore referred to of substantial insolubility and the foliage-adherent property and when mixed with calcium arsenate provides an effective medium to resist the action of dew and rain and to assure the desired maintenance of the complete composition applied to the foliage or elsewhere. The adherent qualities of the hydrous magnesium silicate compound are sufficient also to prevent the applied composition from being readily blown off by the wind.

The hydrous magnesium silicate compound which I prefer to use consists of the following in substantially the proportions stated:

|  | Per cent. |
|---|---|
| Moisture 100–105 C | 1.88 |
| Silica | 36.72 |
| Alumina | 9.20 |
| Iron oxide (FeO) | 0.45 |
| Lime (CaO) | 11.95 |
| Magnesia (MgO) | 33.80 |
| Soda ($Na_2O$) | 0.33 |
| Potash ($K_2O$) | 0.45 |
| Titanic oxide ($TiO_2$) | Trace |
| Ignition loss | 16.10 |

In accordance with the practice customary in stating insecticide formulas, the proportions of the composition have been given above by weight.

I claim:—

1. A foliage-adherent insecticide for dry application consisting of a mixture of an arsenical insect destroying agent, and a powdered hydrous magnesium silicate compound.

2. A foliage-adherent insecticide for dry application consisting of a mixture of calcium arsenate, and a powdered hydrous magnesium silicate compound.

3. A foliage-adherent insecticide for dry application consisting of a mixture of an insect destroying agent, and a powdered hydrous magnesium silicate compound.

4. A foliage-adherent insecticide for dry application consisting of a mixture of an insect destroying agent, and a powdered hydrous magnesium silicate compound, the amount of the former being about four times that of the latter.

In testimony whereof I hereunto affix my signature.

NEIL E. MORGAN.